United States Patent [19]

Esterowitz et al.

[11] Patent Number: 5,206,867
[45] Date of Patent: Apr. 27, 1993

[54] SUPPRESSION OF RELAXATION OSCILLATIONS IN FLASHPUMPED, TWO-MICRON TUNABLE SOLID STATE LASERS

[75] Inventors: Leon Esterowitz, Springfield, Va.; Joseph F. Pinto, Laurel, Md.

[73] Assignee: The United States of America as represented by the Secretary of the Navy, Washington, D.C.

[21] Appl. No.: 829,145

[22] Filed: Jan. 31, 1992

[51] Int. Cl.⁵ .............................................. H01S 3/10
[52] U.S. Cl. .................................. 372/20; 372/21; 372/105
[58] Field of Search .................... 372/19, 20, 21, 22, 372/32, 33, 92, 105; 359/325, 326, 327, 328

[56] References Cited

U.S. PATENT DOCUMENTS 5,079,445  1/1992  Guyer .............................. 359/330
5,107,509  4/1992  Esterowitz et al. ................ 372/20

OTHER PUBLICATIONS

"Suppression of Laser Spiking by Intracavity Second-Harmonic Generation", by T. H. Jeys, *OSA Proceedings on Tunable Solid State Lasers* 5, (OSA, Washington, D.C.), pp. 337-338 (1989).

*Primary Examiner*—Frank Gonzalez
*Attorney, Agent, or Firm*—Thomas E. McDonnell; George Jameson

[57] ABSTRACT

A flashpumped, tunable, two-micron, solid state laser is disclosed in which laser spiking is suppressed. The solid state laser comprises: a laser cavity defined by a first reflective element and an output coupler reflective element to form a reflective path therebetween; a laser crystal disposed in the laser cavity, the laser crystal having a host material doped with preselected activator ions sufficient to produce a pulse of laser emission at a desired laser transition wavelength in a range between about 1.9 microns and about 2.1 microns when the crystal is optically excited to produce the laser emission; a pulsed flashlamp for optically exciting the laser crystal to produce a pulse of laser emission at the desired laser transition wavelength; a tuner disposed in the laser cavity between the laser crystal and one of the reflective elements for tuning the laser emission to the desired laser transition wavelength in the range of wavelengths between about 1.9 microns and about 2.1 microns; optical plates oriented at Brewster's angle in the reflective path for suppressing oscillation of undesired wavelengths within the laser cavity; and a nonlinear crystal disposed in the reflective path to enable the laser to emit through the output coupler reflective element a smooth, long pulse of laser emission without spiking at the desired laser transition wavelength.

34 Claims, 4 Drawing Sheets

SUPPRESSION OF RELAXATION OSCILLATIONS IN FLASHPUMPED, TWO-MICRON TUNABLE SOLID STATE LASERS

CROSS-REFERENCE TO RELATED APPLICATION

This patent application is related to the U.S. Pat. No. 5,107,509, entitled "A Tunable Solid State Laser With High Wavelength Selectivity Over A Preselected Wavelength Range", issued on Apr. 21, 1992, both of which are assigned to the Government of the United States.

BACKGROUND OF THE INVENTION

1. Field of the Invention

The present invention relates to lasers and particularly to a flashpumped, tunable, two-micron, solid state laser in which relaxation oscillations are suppressed.

2. Description of the Prior Art

Development of room temperature solid state lasers in the two-micron spectral range has received renewed attention recently because of potential applications in medicine and optical communications.

A pulsed, flashpumped, two-micron, solid state laser is ideally suited for medical applications because it can produce a high energy for a short period of time (e.g., 1 millisecond) for many laser/tissue interactions in various medical therapies.

An important consideration which determines the effectiveness of the pulsed, flashpumped, two-micron, solid state laser in medical applications concerns the absorption coefficient of the tissue specimen at the operating wavelength of the laser. It is well known that the absorption coefficient band of water, and therefore of tissue, is in the spectral region between about 1.9 microns and about 2.1 microns, with the peak absorption coefficient of water at about 1.96 microns. It is also well known that various tissues of the human body require different penetration depths into those tissues of the laser energy, and therefore different absorption coefficients, for laser ablation to correct for different medical problems associated with those tissues.

In certain surgical procedures, such as for laser operations on brain or eye tissue and the spine and for the tissue welding together of small blood vessels, a very high absorption coefficient is needed to obtain only a very small penetration depth of the laser energy into the tissue. In this case, laser pulses at a wavelength of about 1.95 or 1.96 microns would be utilized to obtain the very small penetration depth of the laser energy.

On the other hand, to obtain larger penetration depths of the laser energy, a lower absorption coefficient would be utilized. For example, in surgical procedures for the removal or treatment of a relatively large volume of tissue, such as a polyp, a tumor, hemorrhoids and cancerous tissue and for the tissue welding together of large blood vessels, a low absorption coefficient is needed to obtain a large penetration depth of the laser energy into the tissue. In such cases, laser pulses at a wavelength of about 2.0 or 2.1 microns would be utilized. In other words, the higher the desired penetration depth, the longer the wavelength (from the peak wavelength of about 1.95 microns) and therefore the lower the absorption coefficient.

As a consequence of the different wavelengths that are needed to obtain the different penetration depths for the different associated surgical therapies, a pulsed, flashpumped, two-micron, tunable, solid state laser is needed for these various medical applications. However, the use of such a pulsed, flashpumped, two-micron, tunable solid state laser in various medical applications presents two problems which bear on the effectiveness of that laser in such medical applications. First, the pulsed, flashpumped, two-micron, tunable, solid state laser must be able to produce a laser emission at any desired low or high gain transition over the exemplary wavelength range of from about 1.9 microns to about 2.1 microns in order to obtain the different penetration depths required for the different surgical therapies. Second, the typical transient spiking behavior of the pulsed, flashpumped, two-micron, solid state laser must be overcome in applications which require a spike-free laser output.

FIRST PROBLEM

In relation to the first problem, it is necessary that the pulsed, flashpumped, two-micron, tunable, solid state laser be able to produce a laser output at any desired low or high gain transition over the exemplary wavelength range of from about 1.9 microns to about 2.1 microns in order to obtain the different penetration depths required for the different surgical therapies. However, such a tunable laser system often encounters higher gain transitions which prevent a desired low gain laser transition from oscillating.

Techniques, such as specially designed mirror coatings, birefringent plates, prisms and other loss elements at an undesired high gain transition, have been used to generate a laser output at a desired low gain transition. These techniques are cumbersome and expensive, and are not flexible when it is desired to tune from one wavelength to another.

Single or multiple stacks of birefringent plates, oriented at Brewster's angle to the laser beam propagation, are commonly used as tuning devices in laser resonators or cavities. The principle of operation is based on the fact that the amount of reflection loss suffered by an electro-magnetic wave at a dielectric surface is dependent on the polarization (i.e., p-polarized or s-polarized) and the angle of incidence of the incident wave, as well as the index of refraction of the dielectric medium (or material of a plate). At an angle of incidence equivalent to Brewster's angle, $\beta$, p-polarized light suffers no reflection loss, while s-polarized light suffers a reflective loss depending on parameters given above. Thus, the tuning operation of a single birefringent plate is based on the phase difference accumulated by components of a linearly polarized input beam polarized along the fast and slow axis of the birefringent element. In general, different amounts of phase retardation accumulated by the fast and slow wave components will result in an output beam which is elliptically polarized. An elliptically polarized output will suffer substantial reflection losses at all Brewster surfaces in the laser cavity. However, for those wavelengths for which the phase difference is an integer number N of $2\pi$ radians, a linearly polarized input mode (p-polarized) undergoes a total retardation of N full waves, leaving the mode unaffected as it exits from the plate. This linearly polarized mode (p-polarized) suffers no reflection loss as it propagates past various Brewster surfaces inside the resonator, and thus corresponds to the operating eigenmode of the laser cavity.

In addition to the primary transmission maxima, the occurrence of secondary transmittance maxima must be considered in the design of a multiple plate birefringent tuning filter. Secondary transmittance maxima correspond to modes for which the total phase retardation of the thickness of the entire stack of one or more birefringent tuning filters corresponds to an integer number of half or full waves. Typically, the transmission value of secondary maxima may reach 75% or greater, depending upon the number of Brewster surfaces of the birefringent plates in the multiple plate birefringent tuning filter. Such high transmission values for these secondary peaks cannot be tolerated for broadband tuning operation of high gain laser systems. This is due to the fact that high secondary peak transmission values may allow strong transitions in the gain medium to oscillate, thereby limiting the tuning capacity of the birefringent tuner assembly. For flashpumped laser systems in particular, this wavelength switching can result in permanent damage to the laser rod end surfaces.

SECOND PROBLEM

In relation to the second problem, most pulsed solid state lasers operating in a normal (long-pulse) mode exhibit transient spiking behavior characteristic of relaxation oscillations. The output of these laser systems consists of large amplitude spikes with typical peak powers of several kilowatts. For many laser applications, particularly in medicine, the high peak powers associated with this spiking behavior may be highly undesirable.

The transient phenomena of spiking is characteristic of laser systems in which the excited state lifetime of the gain medium is considerably longer than the photon lifetime of the resonator. This situation is typical of most solid state lasers which usually have cavity photon lifetimes of several nanoseconds and upper state lifetimes which can be several milliseconds in duration. For example, a Cr;Tm:YAG flashpumped laser (to be discussed later) has a cavity decay time of 15 nanoseconds and an excited state lifetime of 11 milliseconds. The large disparity between the photon and excited state lifetime results in the stong spiking behavior observed for this Cr;Tm:YAG flashpumped laser system during flashpumped operation.

The development of spiking in the output of a laser can be described qualitatively by considering the dynamics of gain and photon density buildup in the resonator. For a laser system which satisfies the lifetime conditions stated above, the population inversion due to pumping can build up to a level substantially higher than its steady state threshold value. The reason for this overshoot is due to the absence of appreciable photon density (and thus stimulated emission) at the beginning of the pumping process.

Once the population inversion surpasses its threshold point, the photon density can rapidly increase well beyond its steady state value as a result of the large available gain. A simultaneous depletion of the population inversion due to stimulated emission occurs to a level just below the threshold value necessary to sustain lasing. The net effect of this gain depletion is a reduction of the cavity photon density to negligible levels.

In the absence of appreciable photon density, the pump begins to replenish the population inversion, overshooting the threshold value once again. This population build-up, followed by a rapid increase in photon density, causes spiking to redevelop. The cycle of population inversion and photon density build-up in the resonator, which continues over a significant fraction of the pump, produces the spiking behavior observed in the laser output.

Such spiking behavior in a pulsed, flashpumped, two-micron, tunable (or even a non-tunable or fixed wavelength) solid state laser can produce deleterious effects on human tissue in medical applications. For example, transient spiking can produce shock effects on the walls of blood vessels. Some scientists believe that such shocks may be a major factor in causing restenosis or reclogging of a blood vessel, which is a major factor in heart attacks.

The conditions under which transient spiking in the output of a pulsed flashpumped laser can be substantially suppressed have been investigated, both theoretically and experimentally. Successful demonstration of spike suppression has been achieved by inserting a suitable element inside the laser cavity which clamps the build-up of high intracavity photon densities. Limiting the cavity photon density to a modest level enables the laser to reach a smooth steady-state operating condition, which eliminates the possibility for spiking behavior.

A common technique for transient spike suppression involves the insertion of an intensity dependent loss mechanism inside of the laser cavity to resist the build-up of a high photon density. Several spike suppression techniques, utilizing some form of intensity dependent negative feedback have been successfully implemented in a number of flashpumped solid state laser systems. One such technique involves the suppression of laser spiking in long-pulse, pulse-pumped 1.06 micron and 1.32 micron Nd:YAG lasers by intracavity second harmonic generation. Such a technique involves the use of second harmonic generation to provide sufficient intracavity loss only at high intensities. Sufficient loss occurring only at high intensities clamps spike formation and enables the flashpumped solid state laser to reach a steady-state operating condition.

To date, Applicants do not know of any flashpumped, two-micron solid state lasers which develop a laser emission without transient spikes. Thus, there is need in the medical field for a pulsed, flashpumped, two-micron, tunable, solid state laser which emits laser pulses without transient spikes.

OBJECTS OF THE INVENTION

According, one object of the invention is to provide a pulsed, flashpumped, two-micron, tunable solid state laser which emits laser pulses without transient spikes at a wavelength between about 1.9 microns and about 2.1 microns.

Another object of the invention is to provide a flashpumped, tunable, two-micron, solid state laser which suppresses transient spikes in the laser.

Another object of the invention is to provide a flashpumped, tunable, two-micron, solid state laser which suppresses transient spikes within its laser cavity and only lases at the lowest order spatial transverse mode of any desired laser transition wavelength between about 1.9 microns and about 2.1 microns.

Another object of the invention is to provide a flashpumped, tunable, Tm-activated garnet laser which produces a laser emission without transient spikes at any desired laser transition wavelength between about 1.9 microns and about 2.1 microns.

A further object of the invention is to provide a flash-pumped, tunable, Ho-activated garnet laser which produces a laser emission without transient spikes at any desired laser transition wavelength between about 1.9 microns and about 2.1 microns.

SUMMARY OF THE INVENTION

The tunable solid state laser includes: a laser cavity defined by a first reflective element and an output coupler reflective element to form a reflective optical path therebetween; a laser crystal disposed in the laser cavity, the laser crystal having a host material doped with preselected activator ions sufficient to produce a laser emission at a laser transition wavelength in a range of wavelengths between about 1.9 microns and about 2.1 microns when the laser crystal is optically excited to produce the laser emission; means for optically exciting the laser crystal to produce a pulse of laser emission in the range of wavelengths; a tunable element disposed in the laser cavity between the laser crystal and one of the reflective elements for tuning the laser emission to any desired laser transition wavelength in the range of wavelengths; first means oriented at Brewster's angle in the reflective path in the laser cavity for suppressing oscillation of undesired wavelengths within the laser cavity; and second means disposed in the reflective path for suppressing laser spiking in the laser cavity to enable the laser to emit through the output coupler reflective element a smooth, long pulse of laser emission without spiking at the desired laser transition wavelength.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
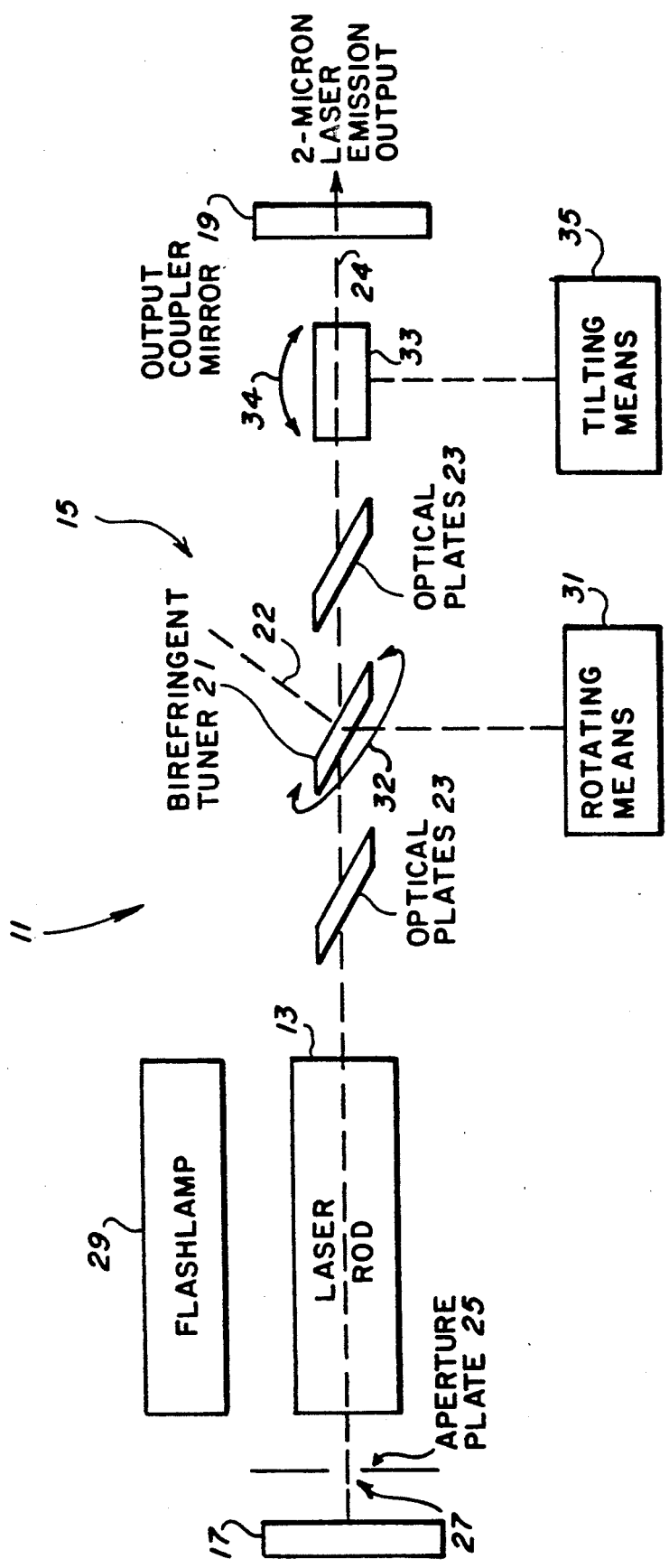
FIG. 1 illustrates an exemplary embodiment of the invention.

Referring now to the drawings, FIG. 1 illustrates a tunable, solid state laser 11 in accordance with a preferred embodiment of the invention. The tunable, solid state laser 11 is comprised of a laser rod or crystal 13 disposed in a laser cavity 15 defined by optically-aligned first reflective element or mirror 17 and output coupler reflective element or mirror 19. The laser rod or crystal 13 is comprised of an exemplary $Cr^{3+}$-sensitized, $Tm^{3+}$-activated, YAG (yttrium aluminum garnet) host material to produce a laser beam or emission which can be tuned within the wavelength range from about 1.9 microns to about 2.1 microns. The mirror 17 is highly reflective, while the mirror 19 is partially transmissive to a laser wavelength of 2 microns to provide the output coupling for the laser emission within the wavelength range of from about 1.9 microns to about 2.1 microns from the laser 11.

A birefringent tuner or birefringent filter 21 is inserted in the cavity 15, at Brewster's angle, between the laser crystal 13 and the output mirror 19. The birefringent tuner 21 is comprised of a stack of one or more exemplary birefringent quartz plates or birefringent filter plates (not shown) oriented at Brewster's angle to the direction of propagation of the laser emission in the laser cavity 15. Each of the birefringent plates of the tuner 21 has an optic axis (not shown) which lies in the plane of that birefringent plate and is aligned in parallel with each of the other optic axes. Tuning of the birefringent tuner 21 is accomplished by rotating the plates of the tuner 21 simultaneously about an axis (not shown) normal to the plane of each plate in the tuner 21.

The maximum primary transmission peak of an individual birefringent plate occurs at a wavelength given by:

$$\lambda = \frac{(n_o - n_e)t}{(\sin\beta)m} (1 - \cos^2\beta \sin^2\alpha) \qquad (1)$$

where:

$n_o$ and $n_e$ are the respective ordinary and extraordinary indices, t is the plate thickness, $\beta$ is Brewster's angle, m is an integer, and $\alpha$ is the angle between the fast axis of the birefringent plate and the s (high loss) polarization of the Brewster surface.

The free spectral range of the birefringent tuner 21 is determined by the thinnest plate in the tuner 21. In general, the thickness of the thinnest plate is selected such that the desired tuning range of the laser 11 falls in the following range of $\alpha$ values:

$$10° \leq \alpha \leq 80° \qquad (2)$$

Additional plates in the birefringent tuner 21, with thickness values which are integral multiples of the thinnest plate, are added to the birefringent tuner 21 to obtain the desired resolution bandwidth of the primary transmission peak. The bandwidth of an individual plate is proportional to the quantity $[(n_o - n_e)t]^{-1}$. Thus, the addition of thicker plates to the birefringent tuner 21 reduces the final bandwidth of the tuner 21.

The requirement that the thicknesses of additional plates be integral multiples of the thinnest plate of the birefringent tuner 21 insures that the primary transmission peak or maxima of each plate occurs at the same wavelength. Thus, the transmission function of the entire assembly of plates in the birefringent tuner 21 will be a convolution of individual plates, with the tuning range determined by the free spectral range of the thinnest plate and the resolution bandwidth determined by the combination of all of the plates in the tuner 21. For example, for tuning between 1.9 microns and 2.1 microns, a birefringent tuner consisting of two quartz plates with respective thicknesses of 1.02 millimeters (mm) and 2.04 mm can be used. Using equation (1), the calculated tuning range of this assembly of two plates (not shown) is between 1.8 microns and 2.39 microns for values of $\alpha$ ranging from 10° to 80°. The calculated bandwidths of the 1.02 mm and 2.04 mm plates are 13.7 nm and 6.85 nm, respectively.

It will be recalled that, in addition to the primary transmission peak or maxima, the occurrence of secondary transmittance maxima must be considered in the design of the multiple plate birefringent tuner 21, and that such secondary transmittance maxima occur for modes in which the total phase retardation of the entire stack thickness of the birefringent tuner 21 corresponds to an integer number of half or full waves. This situation results in reduced reflection losses from Brewster surfaces in the laser cavity 15. As a result of these reduced reflective losses, the transmission value of secondary maxima may reach 75% or greater. Such high secondary peak transmission values may allow strong transitions in the gain medium to oscillate, thereby limiting the tuning capacity of the birefringent tuner 21.

It has been determined that the value of the secondary peak transmission can be reduced by the insertion of additional Brewster surfaces on both sides of the birefringent tuner 21. Increased reflection losses at these additional Brewster surfaces reduce the peak transmission of secondary maxima and thus help to suppress potential oscillation of high gain peak wavelengths. More specifically, a set of optical plates 23, comprised of calcium fluoride, fused silica, barium fluoride or any other suitable transparent material to the wavelength range of interest of the laser 11, are disposed in the cavity 15 at Brewster's angle, and on opposite sides of the birefringent tuner 21, to insure that the operating polarization of the laser 11 is p-polarized.

The term "p-polarized" means that the electric field of the laser beam is parallel to the plane of incidence, which lies in the plane of FIG. 1 and is formed by the line 22 normal to the Brewster surfaces (not shown) in the tuner 21 and the optical path of the laser beam 24. On the other hand, the term "s-polarized" means the the electric field of the laser beam is perpendicular to the plane of incidence.

It should be noted that the exemplary calcium fluoride ($CaF_2$) optical plates have a high transmission from about 0.35 microns to about 7 microns; that the exemplary fused silica optical plates have a high transmission from about 0.16 microns to about 2.3 microns; and that the exemplary barium fluoride ($BaF_2$) optical plates have a high transmission from about 0.2 microns to about 11 microns.

As discussed earlier, the amount of loss suffered by the s-polarized light will depend on the index of refraction of the optical plates. Thus, the number of desired optical plates can be chosen according to the required amount of reflective loss for the s-polarization light.

In a second way that the value of the secondary peak transmission can be reduced, the optical plates 23 oriented at Brewster's angle may be selectively disposed between adjacent plates (not shown) in the birefringent tuner 21. Other possible techniques for minimizing problems with secondary transmission peaks include the utilization of a laser rod 13 with Brewster-cut end faces and/or choosing appropriate plate thickness combinations calculated by Jones matrix analysis, which analysis is well known in the art.

The insertion of these exemplary additional Brewster surfaces of the optical plates 23, that are also oriented at Brewster's angle, on either both sides of the birefringent tuner 21 or between preselected adjacent birefringent plates (not shown) of the birefringent tuner 21 enable the laser 11 to suppress the oscillation of undesired wavelengths within the laser cavity 15. At the same time, these optical plates are transparent to laser emission over the preselected range of wavelengths. In other words, the optical plates 23 enable the wavelength of the laser emission of the tunable solid state laser 11 to be tuned by the birefringent tuner 21 to any desired low gain or high gain laser transition within the preselected range of wavelengths determined by the doped laser rod or crystal 13. For the crystal 13, which in this description of FIG. 1 comprises an exemplary $Cr^{3+}$-sensitized, $Tm^{3+}$-activated, YAG (yttrium aluminum garnet) host material, that preselected range of wavelengths is from about 1.9 microns to about 2.1 microns.

An optional opaque aperture plate 25 containing an aperture 27 may be inserted anywhere along the optical path between the mirrors 17 and 19 to insure TEMoo operation of the laser 11, where "TEM" represents "transverse electric and magnetic" and "TEMoo" represents "the lowest order TEM mode of operation at a selected wavelength" in the laser cavity 15. The opaque aperture plate 25, which can be an exemplary metallic plate containing the aperture 27, restricts the laser operation in the laser cavity 15 to the lowest order mode of operation for the wavelength selected by the birefringent tuner 21. For illustrative purposes, the aperture plate 25 is shown disposed between the laser crystal 13 and the highly-reflective mirror 17.

An excitation means, such as a flashlamp 29 is placed in close proximity to the laser crystal 13 to pump the laser crystal 13. The flashlamp 29 can be pulsed by means (not shown) to emit pulses of light at a pulse repetition frequency of, for example, 1 Hz.

Tuning of the solid state laser 11 over the desired exemplary wavelength range from about 1.9 microns to about 2.1 microns can be achieved by using a rotating means 31, such as a motor or a thumbscrew, which is operationally coupled to the birefringent filter 21, to slowly rotate the birefringent filter 21 about its axis in either of the directions indicated by the arc 32.

The optical plates 23 and birefringent plates in the birefringent tuner 21, which are all oriented at Brewster's angle inside the laser cavity 15, insure that the operating polarization of the emission from the laser 11 is p-polarized.

For spike suppression purposes, a 1 centimeter (cm) long antireflection-coated, lithium iodate ($LiIO_3$), nonlinear crystal 33 is disposed in the optical path 24 in the laser cavity 15 between the output coupler mirror 19 and the optical plates 23 to provide intracavity second harmonic generation of the 2 micron laser radiation from the laser rod 13. The $LiIO_3$ nonlinear crystal 33 is angle-tuned by a tilting means 35 in either of the directions indicated by the second harmonic generation (Type I) of the 2 micron laser radiation.

For efficient conversion by the nonlinear crystal 33 of the 2 micron laser radiation or fundamental wave into a 1 micron second harmonic laser radiation or wave, the phase velocities of the 2 micron and 1 micron waves must be equal to each other. In general, the phase velocities of the 2 micron and 1 micron waves will not be equal, due to the material dispersion of the nonlinear crystal 33. A technique that is widely used to satisfy this phase matching requirement takes advantage of the natural birefringence of the nonlinear crystal 33. The $LiIO_3$ nonlinear crystal 33 is a uniaxial crystal which has 2 refractive indicies for a given direction of polarization and propagation of the 2 micron fundamental wave in the nonlinear crystal 33. By appropriate choice of polarization and propagation direction, it is often possible to obtain phasematching in the nonlinear crystal 33. A common phasematching technique, referred to as Type I phasematching, is based on launching the 2 micron fundamental wave as an ordinary ray and generating the 1 micron second harmonic wave as an extraordinary ray. The phase matching condition for which $n_e^{2\omega}$(the extraordinary index of refraction of the nonlinear crystal 33 at the second harmonic frequency $2\omega$)= $n_o^\omega$(the ordinary index of refraction of the nonlinear crystal 33 at the fundamental wave frequency $\omega$) occurs for a propagation direction which makes an angle $\theta_m$ with respect to the optical axis of the nonlinear crystal 33. The phase matching angle is given by the equation:

$$\sin^2\theta_m = \frac{(n_o^\omega)^{-2} - (n_o^{2\omega})^{-2}}{(n_e^{2\omega})^{-2} - (n_o^{2\omega})^{-2}}$$

where $n_o^{2\omega}$ = the ordinary index of refraction of the nonlinear crystal 33 at the second harmonic frequency $2\omega$.

The relationship between the rotation of the birefringent filter 21 by the rotating means 31 to tune the laser 11 to a desired wavelength in the range between about 1.9 microns and about 2.1 microns and the tilting of the LiIO₃ nonlinear crystal 33 by the tilting means 35 to minimize transient spiking at the desired wavelength can be more clearly understood by now referring to the following TABLE.

TABLE

| Operating Wavelength of Laser 11 (Microns) | Angle of Birefringent Tuner 21 Plates (Degrees) | Phase Matching Angle of Nonlinear Crystal 33 (Degrees) |
|---|---|---|
| 1.939 | 30 | 17.92219 |
| 1.949 | 31 | 17.8878 |
| 1.959 | 32 | 17.85458 |
| 1.969 | 33 | 17.82245 |
| 1.979 | 34 | 17.79154 |
| 1.99 | 35 | 17.7589 |
| 2.00 | 36 | 17.73034 |
| 2.01 | 37 | 17.70285 |
| 2.021 | 38 | 17.67395 |
| 2.032 | 39 | 17.64634 |
| 2.043 | 40 | 17.61999 |
| 2.054 | 41 | 17.59499 |
| 2.065 | 42 | 17.57116 |
| 2.076 | 43 | 17.54859 |
| 2.087 | 44 | 17.52722 |
| 2.098 | 45 | 17.50701 |
| 2.108 | 46 | 17.48971 |

The first column of the TABLE indicates the operating wavelength of the laser 11, which would be determined by the birefringent turner 21 of the laser 11. These wavelengths correlate to the the degrees in the angle of the birefringent turner 21 shown in the second column. The birefringent plates in the birefringent turner 21 are at Brewster's angle. The Brewster angle will essentially not change. It is not the Brewster angle that is being changed by the birefringent turner, but rather the angle of the optical axis of the birefringent turner with respect to the electric field polarization of the 2 micron fundamental laser beam. The nonlinear crystal phase matching angle, shown in the third column of the TABLE, is the angle between the direction of propagation of the 2 micron fundamental beam in the nonlinear crystal 33 and the optical axis of the nonlinear crystal 33. The tilting means 35 adjusts the tilt angle that the optical axis of the nonlinear crystal 33 makes with respect to the propagation direction of the 2 micron fundamental beam in order to maximize second harmonic generation at each of the of the different wavelengths shown in the first column of the TABLE. Thus, the tilt of the tilting means 35 controls the nonlinear crystal phase matching angle.

The reason that there is a different phase matching for each of the wavelengths shown in the TABLE is due to the dispersion of the LiIO₃ material in the nonlinear crystal 33. As is shown in the TABLE, the phase matching angle of 17.92219 degrees is selected by the tilting means 35 to enable the nonlinear crystal 33 to maximize the generation of second harmonics, and hence suppress transient spikes in the laser cavity 15, when the birefringent tuner 21 is tuned by the rotating means 31 to a wavelength of 1.939 microns. Similarly, a phase matching angle of 17.48971 degrees is used to suppress laser spikes in the laser cavity 15 when the tuner 21 is tuned to a wavelength of 2.108 microns.

The birefringent tuner 21 and the tilting means 35 could be calibrated to produce a table similar to the TABLE that was previously discussed. For calibrating the tuner 21 and tilting means 35, a photodiode such as an InGaAs detector (not shown) could be placed at the output of the output coupler mirror 19 to detect a portion of the output 2 micron laser radiation. Such a photodiode only detects laser radiation in the 2 micron region, and not in the 1 micron region. The detected output of the InGaAs detector could then be applied to an oscilloscope (not shown) to monitor the transient spiking in the laser emission and the frequency (or wavelength) of the laser emission. The rotating means 31 could then be rotated to a laser transition wavelength and the rotating means calibrated for that laser transition wavelength. Then the tilting means 35 could be adjusted until the transient spikes that are initially displayed on the oscilloscope are minimized. The spikes will be minimized at the phase match angle of the nonlinear crystal 33 for which the second harmonic radiation is maximized. The tilting means 35 could then be calibrated for that phase match angle. In a similar manner, other operating wavelengths and their associated phase matching angles could be determined and the rotating means 31 and tilting means 35 could be calibrated.

When the rotating means 31 and tilting means 35 are appropriately calibrated, they could be ganged together and controlled by one unit, either manually or by a computer, to simultaneously change the operating wavelength of the fundamental wave frequency and the associated phase matching angle.

In the operation of the flashpumped, tunable, Cr;Tm:YAG laser 11 of FIG. 1, the laser 11 can be tuned from about 1.9 microns to about 2.1 microns, using an exemplary two-plate birefringent tuner 21 comprised of two quartz plates of thicknesses of 1.02 mm and 2.04 mm, respectively. When the birefringent tuner 21 was rotated to a rotation angle of 32 degrees, the operating wavelength of the Cr;Tm:YAG laser 11 was found to be at 1.959 microns and the associated phase matching angle of the nonlinear crystal 33 was found to be at 17.85458 degrees in order to suppress transient spikes at 1.959 microns.

This 1.959 micron wavelength corresponds to a total phase retardation of $8\pi$ radians and $16\pi$ radians in the respective 1.02 mm and 2.04 mm plates of the two-plate birefringent tuner 21. A p-polarized mode at 1.959 microns is unaffected as it traverses the birefringent tuner 21. However, at this same rotation angle of 32 degrees, a secondary transmission peak occurs at a wavelength of 2.014 microns. Although this secondary transmission peak may have a value which is 75% or less than the value of the primary transmission peak value at 1.96 microns, the high gain of the Cr;Tm:YAG laser 11 at 2.014 microns would allow this 2.014 micron transmission to oscillate instead of the weaker gain transition at 1.96 microns. Specifically, the 2.014 micron wavelength undergoes a retardation of 11.6 times $2\pi$ radians through the 3.06 mm total stack thickness of the 1.02 mm and 2.04 mm plates of the two-plate birefringent tuner 21. In other words, a p-polarized mode at 2.014 microns will become almost entirely rotated into the s-polarized mode as it exits through the two-plate birefringent tuner 21.

However, by including the additional Brewster surfaces of the optical plates 23 at the exit surface of the birefringent tuner 21 (e.g., between the birefringent tuner 21 and the output coupler mirror 19), the s-polarized 2.014 micron mode will experience sufficient loss to prevent it from reaching the threshold condition required for laser oscillation in the laser cavity 15. It is also important to have an additional number of the Brewster surfaces of the optical plates 23 at the entrance surface of the birefringent tuner 21 (e.g., between the laser crystal 13 and the birefringent tuner 21) as well in order to sufficiently suppress incoming wavelengths polarized with an s-polarization. Without these additional Brewster surfaces of the optical plates 23, an s-polarized secondary mode at 2.014 microns in the above-discussed exemplary operation certainly would have satisfied the threshold for oscillation and would have caused the flashpumped laser 11 to switch to the high gain secondary peak at 2.014 microns Thus, when it is desired to tune the birefringent tuner 21 to a low gain laser transition, the Brewster-cut optical plates 23 in the laser cavity 15 operate to suppress the oscillation at higher gain laser transitions. This allows the laser cavity 15 to be tuned to the desired low gain transition by changing the birefringent tuner 21 without having the laser emission jump to an undesired higher gain transition. In a similar manner, when it is desired to tune the birefringent tuner 21 to a higher gain transition, the optical plates 23 operate to suppress the oscillations at other undesired laser transitions. Therefore, the tunable, flashpumped, solid state laser 11 of FIG. 1 has the capability of producing a laser emission at any desired low or high laser gain transition over a preselected wavelength range. As stated before, the wavelength range over which the laser 11 operates is basically determined by the particular activator ions used to dope an associated host material of the laser crystal 13, as well as by the optical elements used in the laser cavity 15.

The laser crystal 13 can have an exemplary laser host crystal material (not shown) which is selected from the broad group consisting of YAG (yttrium aluminum garnet), YSGG (yttrium scandium gallium garnet), GSGG (gadolinium scandium gallium garnet), GSAG (gadolinium scandium aluminum garnet), YSAG (yttrium scandium aluminum garnet), YALO (yttrium aluminum oxygen), GGG (gadolinium gallium garnet), YGG (yttrium gallium garnet), LLGG (lanthanum lutetium gallium garnet). As mentioned before, the host crystal material could also be comprised of mixtures or combinations of this group of crystal materials. The preferred group of host crystal materials is comprised of YAG, YSAG and YSGG, and the most preferred host crystal material is YAG.

The selected host crystal material of the laser crystal 13 is doped with a first effective percent concentration of $Cr^{3+}$(chromium) sensitizer ions and with a second effective percent concentration of $Tm^{3+}$(thulium) activator ions. When the laser crystal 13 is pumped or excited by a light pulse from the flashlamp 29, the laser crystal 13 develops an output pulse of laser emission with an associated slope efficiency.

The chief characteristic or requirement of a selected host crystal material is that it must have the capability of easily accepting a transition metal ion (such as $Cr^{3+}$ in this description) and a lanthanide or trivalent rare earth ion (such as $Tm^{3+}$ in this description). The dopant $Cr^{3+}$ ions and $Tm^{3+}$ ions must go into the host crystal material without significantly distorting the lattice of the host crystal material so that the quality of the host crystal material remains high.

The $Cr^{3+}$ ions are the sensitizer ions and their concentration is chosen so that there is good absorption into the host crystal material of the excitation pump from the flashlamp 29. If the $Cr^{3+}$ concentration is too low, there will be poor coupling of the excitation from the flashlamp 29 into the host crystal material. However, if the $Cr^{3+}$ concentration is too high, it will cause thermal lensing and other deleterious effects to the performance of the laser crystal 13. The term "effective percent concentration of $Cr^{3+}$ ions" means that the concentration of $Cr^{3+}$ ions in the host crystal material is sufficient to cause close to a 100% absorption of the excitation from the flashlamp 29 into the host crystal material, in addition to achieving uniform pumping throughout the laser host crystal material. The optimum $Cr^{3+}$ concentration will vary with the dimensions of the host crystal material of the laser crystal 13. Since uniform absorption or pumping is desirable, a lower $Cr^{3+}$ concentration should be used for a larger diameter crystal or rod 13, while a higher $CR^{3+}$ concentration should be employed for a smaller diameter rod 13.

The $Tm^{3+}$ ions are the activator ions which cause the lasing from the laser crystal 13. The $Tm^{3+}$ concentration must be high enough so that an efficient cross-relaxation process (to be explained), which populates the upper laser level, takes place. In addition, the $Tm^{3+}$ and $Cr^{3+}$ concentrations must be high enough so that an energy transfer between the $Cr^{3+}$ sensitizer ions and the $Tm^{3+}$ activator ions is efficient. However, if the $Tm^{3+}$ concentration is too high, losses will increase and the performance of the laser crystal 13 will suffer due to ground state absorption since the lower laser level is in the ground state manifold. The term "effective percent concentration of $Tm^{3+}$ ions" means that the concentration of $Tm^{3+}$ ions in the host crystal material is sufficient to enable a cross-relaxation process to be achieved with close to 100% effectiveness.

When the host crystal material is selected from the above-listed broad group of crystals (YAG, YSGG, GSGG, GSAG, YSAG, YAlO, GGG, YGG and LLGG) and is doped with a first effective percent concentration of $Cr^{3+}$ sensitizer ions between about 0.3% and about 3% and with a second effective concentration of $Tm^{3+}$ activator ions between about 2% and about 12%, a light pulse from the flashlamp 29 enables the laser rod 13 to produce a pulse of laser emission at substantially 2 microns.

When the host crystal material is selected from the preferred group of YAG, YSAG and YSGG crystals and is doped with a preferred first effective percent concentration of $Cr^{3+}$ sensitizer ions between about 0.3% and about 1.5% and with a preferred second effective percent concentration of $Tm^{3+}$ activator ions between about 4.5% and about 7.5%, a light pulse from the flashlamp 29 enables the laser rod 13 to produce a pulse of laser emission at substantially 2 microns.

When the host crystal material is YAG and is doped with a most preferred first effective percent concentration of $Cr^{3+}$ sensitizer ions between about 0.6% and about 0.9% and with a most preferred second effective concentration of $Tm^{3+}$ activator ions between about 5% and about 6%, a light pulse from the flashlamp 29 enables the laser rod 13 to produce a pulse of laser emission at a wavelength of substantially 2 microns.

It should be noted at this time that, by the use of the term of "percent concentration of $Cr^{3+}$ sensitizer ions", it is meant the percent of substitution of the $Cr^{3+}$ ions for the aluminum ions in YAG, for the scandium and gallium ion combination in YSGG, for the scandium and gallium ion combination in GSGG, for the scandium and aluminum ion combination in GSAG, for the scandium and aluminum ion combination in YSAG, for the aluminum ions in YAlO, for the gallium ions in GGG, for the gallium ions in YGG or for the lutetium and gallium ion combination in LLGG.

Similarly, by the use of the term of "percent concentration of $Tm^{3+}$ activator ions", it is meant the percent of substitution of the $Tm^{3+}$ ions for the yttrium ions in YAG, for the yttrium ions in YSGG, for the gadolinium ions in GSGG, for the gadolinium ions in GSAG, for the yttrium ions in YSAG, for the yttrium ions in YAlO, for the gadolinium ions in GGG, for the yttrium ions in YGG or for the lanthanum ions in LLGG.

It should be noted at this time that the selected host crystal material is doped with the first effective percent concentration of $Cr^{3+}$ sensitizer ions and with the second effective percent concentration of $Tm^{3+}$ activator ions by applying techniques well known to those skilled in the art and, hence, requires no further description of such techniques.

A more detailed description of an exemplary composition of the laser crystal or rod 13 and the operation of the laser rod 13, as well as the operation of the laser 11 of FIG. 1, will be given by now referring to FIG. 2.

Figure 2:
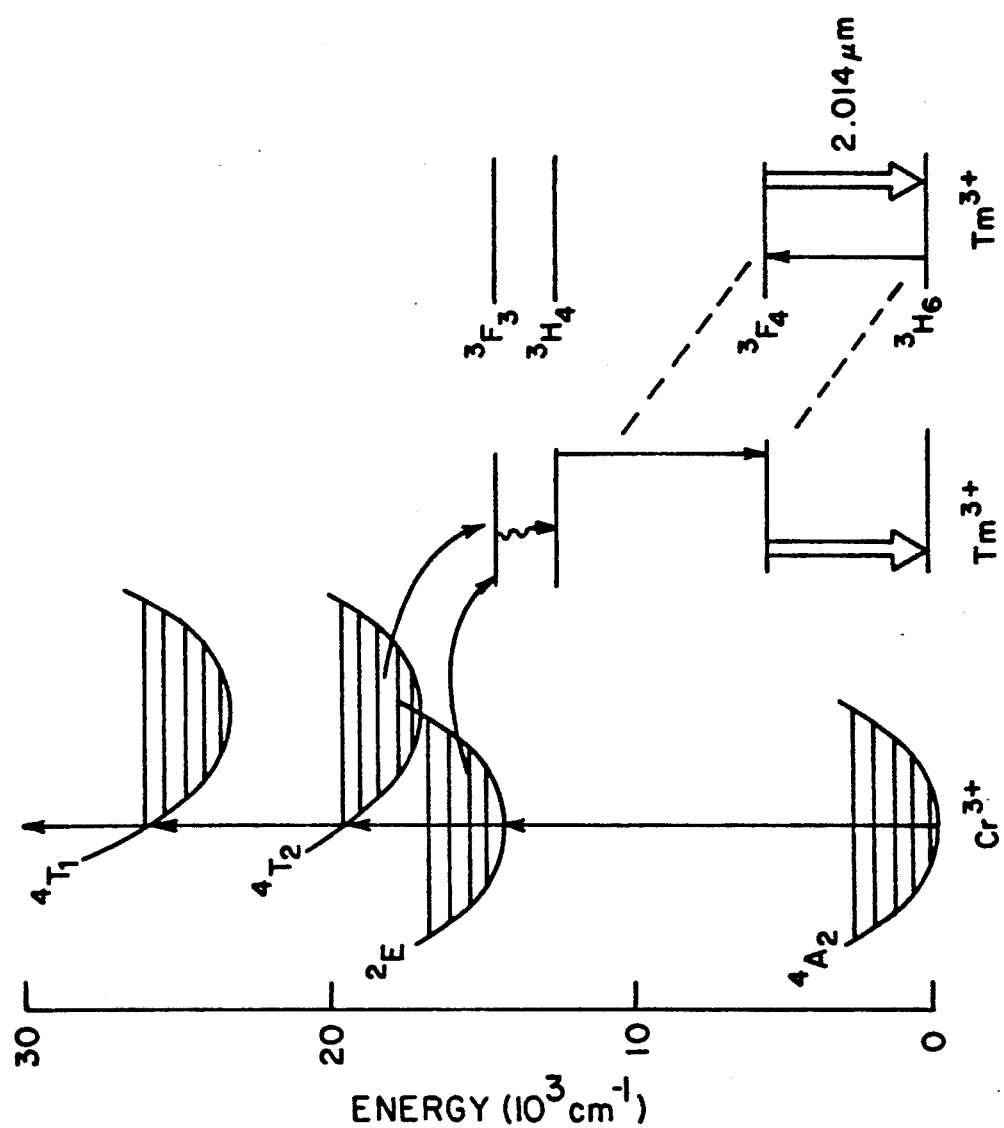
FIG. 2 illustrates the various energy levels of an exemplary chromium- and thulium- doped laser crystal.

FIG. 2 illustrates the various energy levels of the exemplary chromium ($Cr^{3+}$) and thulium ($Tm^{3+}$) doped laser crystal or laser rod 13 of FIG. 1. More specifically, FIG. 2 is a diagram of the various energy levels for the $Cr^{3+}$ and $Tm^{3+}$ ions in the laser rod 13, which can be comprised of an exemplary YAG host material. The importance of the $Cr^{3+}$ to $Tm^{3+}$ transfer efficiency to the 2 micron laser operation can be seen from the pumping scheme illustrated in FIG. 2.

In operation, each light pulse from the flashlamp 29 is absorbed in the $^4T_1$ and $^4T_2$ bands of the $Cr^{3+}$ ions. After a nonradiative decay to and within the $^4T_2$ and $^2E$ levels or states of the $Cr^{3+}$ ions, the excitation is transferred from the $Cr^{3+}$ ions to the $^3F_3$ and $^3H_4$ states of the $Tm^{3+}$ ions by way of dipole-dipole interactions Nonradiative decay of the $^3F_3$ level places virtually all of the excited $Tm^{3+}$ ions in the $^3H_4$ state. Each excited $Tm^{3+}$ ion then interacts with a ground-state $Tm^{3+}$ in a cross-relaxation process which gives rise to two $Tm^{3+}$ ions in the $^3F_4$ state. This $^3F_4$ state or level is the upper laser level. Lasing or photon emission then occurs at about 2.014 microns as the excited $Tm^{3+}$ ions in the $^3F_4$ upper laser level decay to the $^3H_6$ lower laser level.

Cross-relaxation is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level. The obvious advantage of this cross-relaxation process or operation is that a single $Tm^{3+}$ ion excited to the $^3H_4$ level generates two $Tm^{3+}$ ions in the $^3F_4$ upper laser level. Experiments have shown that the probability of the $Tm^{3+}$ cross-relaxation occurring is negligible for concentrations of $Tm^{3+}$ ions less than about 2%, but approaches unity for concentrations of $Tm^{3+}$ ions greater than about 5%.

A room temperature tunable laser emission within the wavelength range from about 1.9 microns to about 2.1 microns was derived by the present applicants. The composition of the laser rod 13 was selected to be favorable for all of the processes involved in flashlamp pumping at room temperature. As previously discussed in relation to FIG. 2, these processes were: absorption of the flashlamp light in the $^4T_1$ and $^4T_2$ bands of $Cr^{3+}$, nonradiative transfer of the excitation from the thermally mixed $^4T_2/^2E$ levels of $Cr^{3+}$ to the $^3F_3$ levels of $Tm^{3+}$, and cross-relaxation among $Tm^{3+}$ ions to populate the $^3F_4$ upper laser level.

A laser rod 13 having a YAG ($Y_3Al_5O_{12}$) host material was selected. The YAG laser rod 13 was 5.0 mm in diameter and 76.3 mm in length. The rod ends were polished flat and parallel and had broad anti-reflection coatings centered at 2.0 microns. The laser cavity mirrors 15 and 17 of FIG. 1 are respectively disposed adjacent to the polished ends of the laser rod 13. The diffusereflecting pump cavity had a pumping length of 69 mm so that at least 91% of the rod length was pumped by the flashlamp.

Within the YAG laser rod 13, a $Cr^{3+}$ ion concentration of 5.6 times $10^{19}$ cm$^{-3}$ (which is about a 0.6% concentration of $Cr^{3+}$ sensitizer ions, as defined above) and a $Tm^{3+}$ concentration of 8.3 times $10^{20}$ cm$^{-3}$ (which is about a 6.0% concentration of $Tm^{3+}$ activator ions, as defined above) was chosen.

The $Cr^{3+}$ ion concentration of 5.6 times $10^{19}$ cm$^{-3}$ (or 0.6% concentration) was chosen in order to provide an optimized balance between the efficient absorption of the flashlamp light in the laser rod 13 and uniform pumping of the mode volume in the 5 mm diameter YAG laser rod 13. Changing the value of the $Cr^{3+}$ ion concentration had very little effect (<5%) on the $Cr^{3+}$ to $Tm^{3+}$ transfer efficiency in YAG.

The $Tm^{3+}$ ion concentration of 8.3 times $10^{20}$ cm$^{-3}$ (or 6.0% concentration) was chosen to favor both the $Cr^{3+}$ to $Tm^{3+}$ energy transfer and the $Tm^{3+}$ cross relaxation processes. Previous work had shown that the $Cr^{3+}$ to $Tm^{3+}$ energy transfer was most efficient in a YAG host material, and that it occurs almost exclusively by a direct dipole-dipole interaction. The $Cr^{3+}$ to $Tm^{3+}$ transfer efficiency in the Cr:Tm:YAG material in the laser rod 13 was determined by measuring the $C^{3+}$ fluorescence following a pulsed laser excitation and was found to be 97.5%

The doped laser rod 13 was pumped by a single simmered Xe flashlamp 29 having a 63.5 mm arc length, filled to 630 Torr, with a 4 mm bore diameter. The flashlamp 29 was pulsed at a pulse repetition frequency of one Hertz (1 Hz).

As stated before, tests have shown that the probability of the Tm$^{3+}$cross-relaxation was negligible for Tm$^{3+}$concentrations less than about 2%, but approaches unity for Tm$^{3+}$concentrations greater than about 5%. The 6% Tm$^{3+}$used in this description takes full advantage of the T$^{3+}$cross-relaxation process. However, increasing the Tm$^{3+}$above this 6% level is not advantageous because of losses due to ground-state absorption of the 2.0 micron laser emission.

Figure 3A:
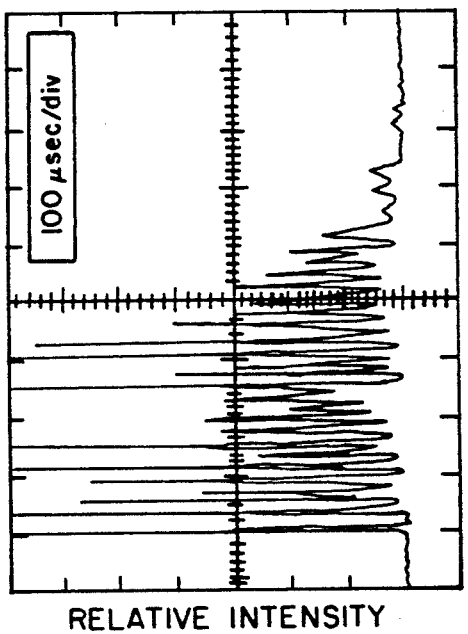
FIG. 3A shows a temporal profile of the Cr;Tm:YAG laser output with the $LiIO_3$ crystal detuned completely to prevent frequency doubling.

FIG. 3A illustrates a temporal profile of the 2 micron laser output of the pulsed flashpumped Cr;Tm:YAG laser 11 with the LiIO$_3$ nonlinear crystal 33 detuned completely by the tilting means 35 to prevent frequency doubling of the 2 micron emission. As a consequence, a spiking operation results wherein a series of relaxation oscillations or large amplitude transient spikes appear in the laser output. This spiking behavior lasts for a period of about 600 microseconds, with the average pulsewidth of an individual spike being about 5 microseconds in duration. As shown on the right-hand side of FIG. 3A, an output energy of 465 mJ (millijoules) at the fundamental wavelength frequency (E$\omega$) is developed by the laser 11. Note that E$^{2\omega}$, which is the energy at the second harmonic, is equal to 0 mJ, since no second harmonics are generated when the nonlinear crystal 33 is detuned.

Figure 3B:
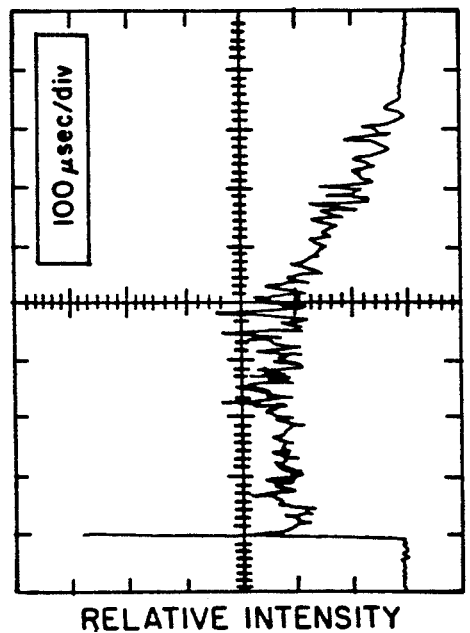
FIG. 3B shows a temporal profile of the Cr;Tm:YAG laser output with the $LiIO_3$ crystal tilted to the proper phase-matching angle for maximum second harmonic generation.

FIG. 3B illustrates a temporal profile of the 2 micron laser output of the pulsed flashpumped Cr;Tm:YAG laser 11 with the LiIO$_3$ nonlinear crystal 33 tilted by the tilting means 35 to the proper phasematching angle (as indicated in the above-described TABLE) for maximum second harmonic generation. As a consequence, a non-spiking operation results wherein the very first spike that enters the nonlinear crystal 33, after the laser 11 is initially turned on, is significantly clamped to a level that is almost a factor of 10 lower than the level of the first spike in FIG. 3A. After that first spike is clamped, only one or two additional, greatly-suppressed spikes appear in the laser output. For a laser output energy at 2 microns, E$^\omega$=465 mJ and E$^{2\omega}$=28 mJ. The absence of spiking, as shown in FIG. 3B, demonstrates the strong clamping effect induced by the nonlinear crystal 33 to prevent the formation of spikes in the laser cavity 15. The low conversion efficiency of the nonlinear crystal 33 at these intensity levels results in negligible intracavity loss. Thus, the 2 micron laser energy output is essentially unchanged by the introduction of the nonlinear crystal into the laser cavity 15.

Figure 4:
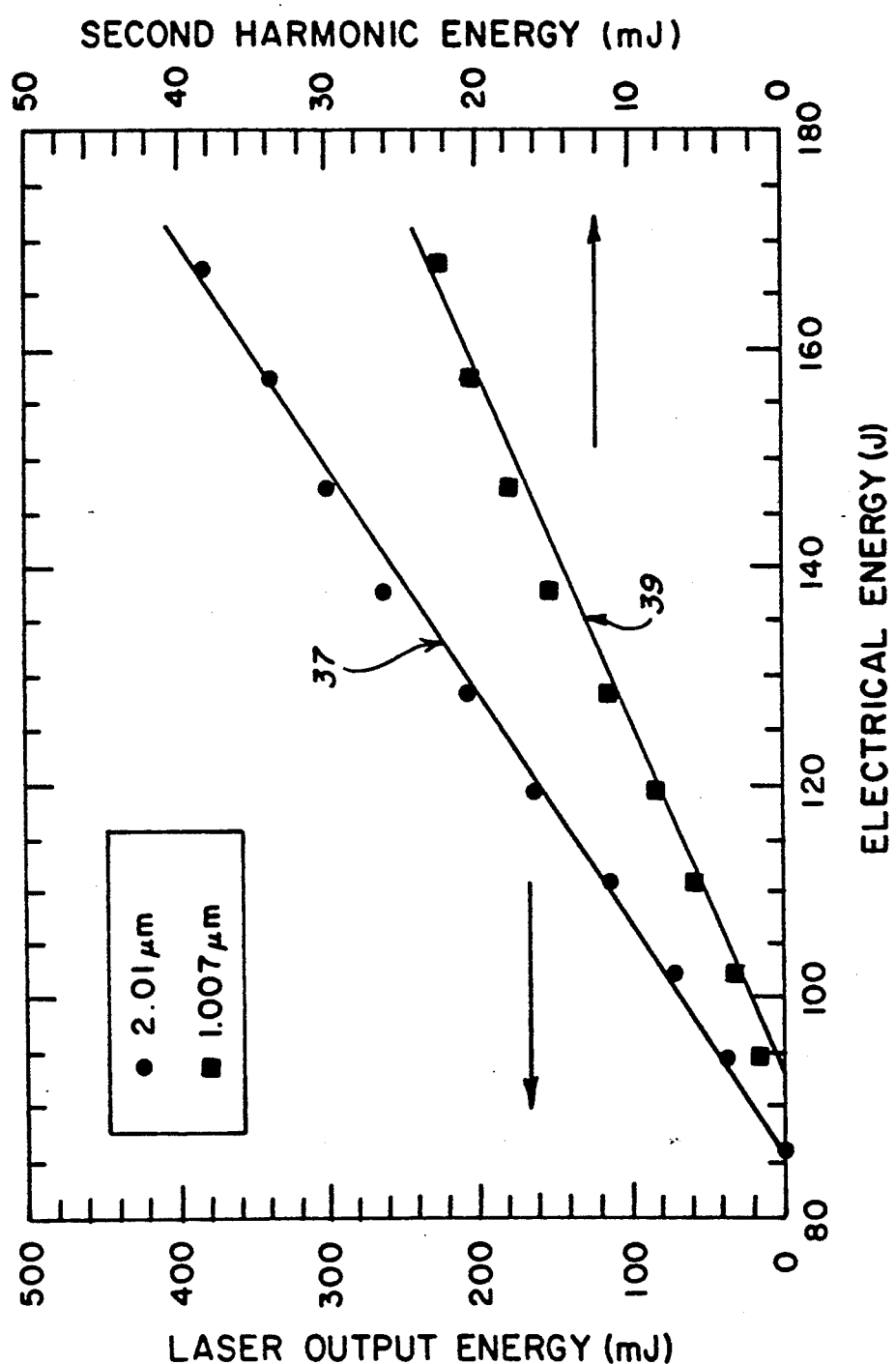
FIG. 4 illustrates the laser performance in a two-micron, Cr;Tm:YAG laser during non-spiking operation.

FIG. 4 illustrates the laser performance in the flashpumped, two-micron, Cr;Tm:YAG laser 11 during non-spiking operation. Waveform 37 shows the relatively high amounts of 2.01 micron laser output energy (in mJ) that can be outputted from the laser 11 as a function of input electrical energy (in J). On the other hand, waveform 39 shows the relatively small amounts of second harmonic energy that is generated by the nonlinear crystal 33 as a function of the input electrical energy. The 2.014 micron laser output energy is represented on the vertical scale on the left and has a peak value of about 465 mJ, whereas the the second harmonic energy is represented on the vertical scale on the right and has a peak value of about 28 mJ. A comparison of the curve 39 to the curve 37 shows that very little energy is lost in generating the low energy second harmonic even at the higher laser output energies of 400 mJ or more. A comparison of the curves 37 and 39 to each other also indicates the relatively low conversion efficiency of 0.1%. This is a very small intracavity loss that is sustained in the suppression of transient spikes in a flashpumped, 2-micron, solid state laser.

Therefore, what has been described in a preferred embodiment of the invention is a flashpumped, tunable, two-micron, solid state laser which suppresses transient spikes within its laser cavity and produces pulses of laser emission at any desired laser transition wavelength between about 1.9 microns and about 2.1 microns.

It should therefore readily be understood that many modifications and variations of the present invention are possible within the purview of the claimed invention. For example, a KTP nonlinear crystal could replace the LiIO$_3$ nonlinear crystal 33 as a frequency doubler to suppress transient spiking. Also, other dopants could be utilized in the host material of the laser rod 13 to lase at 2 microns. For example, Cr;Tm;Ho could be used as dopants, with Cr and Tm operating as sensitizer ions and Ho operating as activator ions; and Cr;Ho could be used as dopants, with Cr operating as sensitizer ions and Ho operating as the activator ions. It is therefore to be understood that, within the scope of the appended claims, the invention may be practiced otherwise than as specifically described.

WHAT IS CLAIMED AND DESIRED TO BE SECURED BY LETTERS PATENT OF THE UNITED STATES IS:

1. A solid state laser comprising:
   a laser cavity defined by a first reflective element and an output coupler reflective element to form a reflective path therebetween;
   a laser crystal disposed in said laser cavity, said laser crystal having a host material doped with preselected activator ions sufficient to produce a laser emission at a laser transition wavelength in a range of wavelengths between about 1.9 microns and about 2.1 microns when said laser crystal is optically excited to produce said laser emission;
   means for optically exciting said laser crystal to produce a pulse of laser emission in said range of wavelengths;
   means disposed in said laser cavity between said laser crystal and one of said reflective elements for tuning said laser emission to a desired laser transition wavelength in said range of wavelengths;
   first means oriented at Brewster's angle in said reflective path in said laser cavity for suppressing oscillation of undesired wavelengths within said laser cavity; and
   second means disposed in said reflective path for suppressing laser spiking in said laser cavity to enable said laser to emit through said output coupler reflective element a smooth, long pulse of laser emission without spiking at said desired laser transition wavelength.

2. The laser of claim 1 wherein said second means includes:
   a nonlinear crystal disposed in said reflective path for generating second harmonics of said desired laser transition wavelength to suppress laser spiking at said desired laser transition wavelength in said laser cavity; and
   means for tilting said nonlinear crystal to a proper phasematching angle for maximum second harmonic generation.

3. The laser of claim 2 wherein:
   said nonlinear crystal is a lithium iodate crystal.

4. The laser of claim 1 further including:

aperture means disposed in said reflective path in said laser cavity for allowing said laser to operate only at the lowest order spatial transverse mode of the desired laser transition wavelength in said range of wavelengths.

5. The laser of claim 4 wherein said aperture means includes:
an opaque element containing a hole disposed in said reflective path for only passing the lowest order spatial transverse mode of the desired laser transition wavelength therethrough.

6. The laser of claim 1 wherein said first means includes:
at least one optical plate oriented at Brewster's angle on each side of said tuning means to suppress the oscillation of undesired laser transition wavelengths within said laser cavity, said at least one optical plate being transparent to laser emission over said range of wavelengths.

7. The laser of claim 1 wherein said first means includes:
first and second sets of optical plates oriented at Brewster's angle and respectively disposed on opposite sides of said tuning means to suppress the oscillation of undesired wavelengths within said laser cavity, said optical plates being transparent to laser emission over said range of wavelengths.

8. The laser of claim 7 wherein:
said optical plates are comprised of material selected from the group consisting of calcium fluoride, fused silica and barium fluoride.

9. The laser of claim 1 wherein said first means comprises:
Brewster-cut end faces on said laser crystal.

10. The laser of claim 1 wherein:
said laser crystal has Brewster-cut end faces for further suppressing the oscillation of undesired laser transition wavelengths within said laser cavity.

11. The laser of claim 1 wherein said tuning means includes:
a tuning element; and
means for rotating said tuning element about its optic axis to tune said laser emission to a different laser transition wavelength within said range of wavelengths.

12. The laser of claim 11 wherein said second means includes:
a nonlinear crystal disposed in said reflective path for generating second harmonics of said desired laser transition wavelength to suppress laser spiking at said desired laser transition wavelength in said laser cavity; and
means for tilting said nonlinear crystal to a proper phasematching angle for maximum second harmonic generation.

13. The laser of claim 12 wherein:
said nonlinear crystal is a lithium iodate crystal.

14. The laser of claim 11 wherein said tuning element includes:
a stack of birefringent plates oriented at Brewster's angle to the direction of propagation of said laser emission.

15. The laser of claim 14 wherein:
said birefringent plates have predetermined thicknesses, with the thicker ones of said birefringent plates having integer multiples of the thickness of the thinnest said birefringent plate.

16. The laser of claim 11 wherein said tuning element includes:
at least one birefringent plate oriented at Brewster's angle to the direction of propagation of said laser emission.

17. The laser of claim 16 wherein:
said at least one birefringent plate has substantially flat and substantially parallel first and second surfaces.

18. The laser of claim 17 wherein:
said at least one birefringent plate is comprised of a material selected from the group consisting of sapphire and quartz, and said at least one birefringent plate is disposed in said laser cavity at the Brewster angle substantially between the normal to said first surface of said at least one birefringent plate and the path of said laser emission from said laser crystal.

19. The laser of claim 2 wherein said second means includes:
a nonlinear crystal disposed in said reflective path for generating second harmonics of said desired laser transition wavelength to suppress laser spiking at said desired laser transition wavelength in said laser cavity; and
means for tilting said nonlinear crystal to a proper phasematching angle for maximum second harmonic generation.

20. The laser of claim 19 wherein:
said nonlinear crystal is a lithium iodate crystal.

21. The laser of claim 19 wherein:
said tuning means includes a tuning element comprised of a stack of birefringent plates oriented at Brewster's angle to the direction of propagation of said laser emission, each of said birefringent plates having an optic axis which lies in the plane of that birefringent plate and is aligned in parallel with each of the other said optic axes; and means for rotating said tuning element about an axis normal to said optic axes to tune said laser emission to a different wavelength within said range of wavelengths; and
said aperture means includes an opaque element containing a hole in said reflective path for only passing the lowest order spatial transverse mode of said desired laseer transition wavelength therethrough.

22. The laser of claim 21 wherein:
said birefringent plates have predetermined thicknesses, with the thicker said birefringent plates having integer multiples of the thickness of the thinnest said birefringent plate.

23. The laser of claim 21 wherein said first means includes:
a plurality of optical plates oriented at Brewster's angle and selectively disposed between preselected adjacent birefringent plates in said tuning element to suppress the oscillation of undesired laser transition wavelengths within said laser cavity, said optical plates being transparent to laser emission over said range of wavelengths.

24. The laser of claim 23 wherein:
said optical plates are comprised of a material selected from the group consisting of calcium fluoride, fused silica and barium fluoride.

25. The laser of claim 23 wherein:
said birefringent plates have predetermined thicknesses, with the thicker said birefringent plates having integer multiples of the thickness of the thinnest said birefringent plate.

26. The laser of claim 21 wherein:
said first means includes first and second sets of optical plates oriented at Brewster's angle and respectively disposed on opposite sides of said stack of birefringent plates to suppress the oscillation of undesired wavelengths within said laser cavity, said optical plates being transparent to laser emissions over said range of wavelengths.

27. The laser of claim 26 wherein:
said birefringent plates have predetermined thicknesses, with the thicker said birefringent plates having integer multiples of the thickness of the thinnest said birefringent plate.

28. The laser of claim 1 wherein:
said preselected activator ions in said host material comprise a dopant of $Tm^{3+}$ ions; and
said host material further includes a dopant of $Cr^{3+}$ sensitizer ions.

29. The laser of claim 28 wherein:
said host material is selected from the group consisting of YAG, YSGG, GSGG, GSAG, YSAG, YAlO, GGG, YGG, LLGG, and mixtures thereof;
said dopant of $Cr^{3+}$ ions has an effective percent concentration of between about 0.3% and about 3%; and
said dopant of $Tm^{3+}$ ions has an effective percent concentration of between about 2% and about 12%.

30. The laser of claim 28 wherein:
said host material is selected from the group consisting of YAG, YSAG, YSGG and GSGG;
said dopant of $Cr^{3+}$ ions has an effective percent concentration of between about 0.3% and about 1.5%; and
said dopant of $Tm^{3+}$ ions has an effective percent concentration of between about 4.5% and about 7.5%.

31. The laser material of claim 28 wherein:
said host material is YAG;
said dopant of $Cr^{3+}$ ions has an effective percent concentration of between about 0.6% and about 0.9%; and
said dopant of $Tm^{3+}$ ions has an effective percent concentration of between about 5% and about 6%.

32. The laser of claim 1 wherein:
said laser crystal is substantially in the form of a cylindrical laser rod whose long dimension is along the cylinder axis; and
said optically exciting means is a pulsed flashlamp having a long dimension along a first axis which is substantially parallel to said cylinder axis of said cylindrical laser rod for enabling said $Cr^{3+}$ ions in said cylindrical laser rod to absorb light from said flashlamp along the long dimension of said laser rod.

33. The laser of claim 32 wherein:
said preselected activator ions in said host material comprise a dopant of $Tm^{3+}$ ions; and
said host material further includes a dopant of $Cr^{3+}$ sensitizer ions.

34. A solid state laser comprising:
a laser cavity defined by an input reflective element and an output coupler reflective element to form a reflective optical path therebetween;
a laser crystal disposed in said laser cavity, said laser crystal having a host material selected from the group consisting of YAG, YALO, YSAG, YSGG, YGG, GGG, GSAG, GSGG, LLGG and mixtures thereof, said host material being doped with $Cr^{3+}$ sensitizer ions and $Tm^{3+}$ activator ions sufficient to produce a laser emission at a desired wavelength in a range of wavelengths between about 1.9 microns and about 2.1 microns when said laser crystal is optically excited to produce said laser emission;
flashlamp means for exciting said laser crystal to produce a pulsed laser emission in the range of a plurality of wavelengths determined by Stark components in the $^3F_4$ to $^3H_6$ laser transition in said thulium activator ions when said laser crystal is excited by said exciting means;
means disposed in said laser cavity between said laser crystal and one of said reflective elements and oriented at Brewster's angle in said reflective path for tuning said laser emission to any desired one of said plurality of wavelengths within the range between approximately 1.9 microns and approximately 2.1 microns;
first means oriented at Brewster's angle in said reflective path on at least one side of said tuning means for suppressing oscillation of undesired wavelengths within said laser cavity and only enabling said desired wavelength to pass out of said output coupler reflective element; and
second means disposed in said reflective path for suppressing laser spiking in said laser cavity to enable said laser to emit through said output coupler reflective element a smooth, long pulse of laser emission without spiking at said desired laser transition wavelength.

* * * * *